United States Patent Office 3,442,678
Patented May 6, 1969

3,442,678
METHOD FOR TREATING RAW PIGMENTARY TITANIUM DIOXIDE
Joseph Ross, Barberton, Ohio, assignor to PPG Industries, Inc., Pittsburgh, Pa., a corporation of Pennsylvania
No Drawing. Filed Aug. 31, 1965, Ser. No. 484,094
Int. Cl. C09c *1/36;* C01g *23/08*
U.S. Cl. 106—300    6 Claims

ABSTRACT OF THE DISCLOSURE

The preparation of pigmentary metal oxide, e.g., titanium dioxide, by vapor phase oxidation of metal halide, e.g., titanium tetrahalide, is discussed. Raw pigment, i.e., that has had its chemical composition unaltered, is digested in the presence of a soluble fluorine compound in order to improve the pigmentary properties of the pigment.

---

This invention relates to a process for wet treating raw pigmentary metal oxide. More particularly, this invention relates to a process for wet treating and significantly improving the pigmentary properties of a metal oxide, notably titanium oxide, produced by the vapor phase oxidation of a metal halide.

Titanium oxide is currently produced commercially by at least two processes, the chloride process and the sulfate process.

The chloride process involves the vapor phase oxidation or hydrolysis of at least one titanium halide selected from the group consisting of titanium chloride, titanium bromide, and titanium iodide, e.g., a titanium tetrahalide such as $EiCl_4$, $TiBr_4$, and $TiI_4$.

Typical chloride processes wherein titanium oxide is produced by the vapor phase oxidation or hydrolysis of a selected titanium halide include U.S. Letters Patents 2,450,156 to Pechukas; 2,937,928 to Hughes et al.; 2,968,529 to Wilson; 3,068,113 to Strain et al.; and 3,069,281 to Wilson. Such vapor phase oxidation process may be conducted in a fluidized bed as disclosed in U.S. Letters Patents 2,760,846 to Richmond; 2,856,264 to Dunn; and 2,964,386 to Evans et al.

Such vapor phase oxidation or hydrolysis processes, commonly referred to as chloride processes, are readily distinguishable from the so-called sulfate processes as disclosed, for example, in U.S. Letters Patents 2,505,344, 2,766,133, 2,933,408, and 2,982,613.

The practice of this invention is expressly limited to a vapor phase process as distinguished from a sulfate process.

In accordance with the practice of this invention, a slurry of raw vapor phase oxidation produced metal oxide, such as titanium oxide, is digested in the presence of at least one soluble fluorine-containing compound, particularly a fluoride compound.

It has been discovered that when a raw pigment slurry is digested in accordance with this invention, e.g., in the presence of a soluble fluoride compound, there results a significant improvement in the pigment properties, particularly tint efficiency and tinting strength. Likewise, the pigment dispersibility and wetting properties, especially in organic vechicles, are significantly improved.

Raw pigment, particularly raw titanium oxide pigment, as used herein, is defined as a pigment (produced by a vapor phase oxidation process) which has had its chemical composition substantially unaltered.

Thus, a pigment subsequent to withdrawal from a vapor phase oxidation or hydrolysis zone may be physically treated, e.g., by milling, grinding, hydroseparating, filtering, without changing the basic chemical composition of the pigment. Such pigment is defined herein as a raw pigment.

A raw pigment is therefore to be distinguished from a finished or treated pigment, the latter being a pigment which has been given an organic and/or inorganic coating or treatment as disclosed, for example, in U.S. Letters Patents 2,046,823 to Johnson; 2,717,246 to Kienle et al.; 2,721,853 to Eastes et al.; 3,146,119 to Dr. Hartien S. Ritter.

The chemical composition of the raw titanium oxide pigment will be dependent upon the nucleating and/or rutile promoting agents used in the vapor phase reaction, e.g., aluminum, zirconium, potassium, sodium, zinc, silicon, rubidium, boron.

It has been discovered that this invention is particularly suitable for treating a raw titanium oxide pigment containing co-burned silica ($SiO_2$), preferably at least 0.25 percent by weight $SiO_2$ based on the weight of the titanium oxide pigment. Co-burned silica is the silica formed in conjunction with the titanium oxide pigment during the vapor phase oxidation of titanium halide in the presence of silicon or a silicon compound such as $SiCl_4$.

In the practice of this invention, a soluble fluorine-containing compound is incorporated in the raw pigment slurry in an amount which will provide at least 0.01 percent fluorine ion by weight of the slurried titanium oxide pigment. Preferably, the compound is added in an amount sufficient to provide 0.05 to 5.0, ideally 0.1 to 1.0 percent by weight fluorine ion based on the weight of the slurried pigment.

Although it is contemplated in the preferred embodiment of this invention that the slurry be initially pure of fluorine compounds and/or active ions, such may be present if the slurry or filtrate thereof is recycled.

Where fluorine compounds are present in the slurry, the amount thereof may be subtracted from the amount of fluorine compounds to be incorporated in the slurry.

In the preferred embodiment of this invention, the raw pigment is slurried in distilled or deionized water containing substantially no fluorine-containing compounds such that substantially all of the compound is incorporated independently of that existing in the slurry water.

It is contemplated using a fluorine compound which is soluble in the slurry at an acid, neutral, and/or alkaline pH range. It is particularly desirable that the compound be soluble in the slurry at the pH of the digestion.

Typical fluorine compounds comprise both organic and inorganic compounds, particularly the fluorides of ammonia including $NH_4BF_4$ (ammonium fluoborate), $NH_4F$ (ammonium fluoride), $NH_4F \cdot HF$ (ammonium acid fluoride), and $NH_4SO_3F$ (ammonium fluosulfonate). Best results have been obtained with the use of HF (hydrofluoric acid).

The raw pigment slurry is digested in the presence of the selected fluorine compound at a temperature of at least 50° C., preferably at least 75° C., up to the boiling point of the slurry, usually 80° to 90° C.

The period of digestion is at least five minutes, typically at least 45 minutes, and preferably one hour to ten hours.

The slurry pH during the digestion will be a function of the particular pigment treatment process. Thus, beneficial results will be obtained when the raw pigment slurry is digested at any pH in the presence of a fluorine compound.

In one embodiment of this invention, the raw pigment slurry is digested at a low acid pH, e.g., below 3.0, as disclosed in copending U.S. patent application Ser. No. 469,864, filed July 6, 1965, by Dr. Albert Dietz and Dr. Harry Lott, Jr.

In still another embodiment, the raw pigment slurry is digested at a high alkaline pH, e.g., at least 10.0, as disclosed in U.S. patent application Ser. No. 469,881, filed July 6, 1965, by Dr. Harry Lott, Jr. and Dr. Albert Dietz.

In still other embodiments, the pigment slurry is digested in an intermediate pH range, e.g., 3.0 to 10.0, particularly in the flocculation range of about 5.3 to about 8.3.

When the slurried pigment is digested in the intermediate range, it is particularly expedient to coat or otherwise treat the pigment near the end of the digestion. Advantages are also obtained when the coating treatment is applied immediately subsequent to the digestion.

Likewise, when the pigment is digested at a higher pH, e.g., at least 10.0, it is of benefit to coat the pigment immediately following the digestion.

Typically, the pigment is coated following the digestion with at least one hydrous oxide of aluminum titanium and/or silicon.

Accordingly, it is contemplated that this invention may be employed with other wet treatment processes, particularly the coating processes, e.g., as disclosed in U.S. Letters Patent 3,146,119.

The practice of this invention significantly improves the pigmentary properties of the treated pigment, particularly tint efficiency and tinting strength.

Tint efficiency as used herein refers to the reflectometry method disclosed on pages 704 to 715, volume 34, Journal of Paint Technology and Engineering (Official Digest, July 1962).

A standard common commercial type enamel paint is prepared out of a known amount of a standard pigment, vehicle, and colorant (tint).

An enamel paint is also prepared from the sample pigment, and compared with the standard using a reflectometer.

Titanium oxide pigment treated in accordance with this invention characteristically has a tint efficiency improvement of at least 3 percent, typically at least 5 percent. Thus, the pigment is commonly 97 to 110 percent of the standard as measured by a reflectometer.

Titanium oxide pigment not treated in accordance with this invention commonly has a tint efficiency of 95 percent or less.

Raw titanium oxide pigment produced by the vapor phase oxidation of $TiCl_4$ characteristically has a low tint efficiency. Often raw titanium oxide pigment will float or flood such that its tint efficiency cannot be determined. Floating or flooding is where the pigment floats to the top of the paint film and/or the tint has flocculated to the bottom of the film.

The tinting strength of the pigment may be determined by many arbitrary methods. One such method is A.S.T.M. D-332-26, "1949 Book of A.S.T.M. Standards," part 4, page 31, published by American Society for Testing Material, Philadelphia 3, Pennsylvania.

The following are typical working examples, representing the best mode contemplated by the inventors in the carrying out of this invention.

Example I

Titanium tetrachloride ($TiCl_4$) is reacted in the vapor phase with oxygen at 1,000° C. in the presence of aluminum trichloride ($AlCl_3$) and silicon tetrachloride ($SiCl_4$) to produce a raw titanium oxide pigment containing about 1.80±0.15 percent by weight $Al_2O_3$ and about 0.56±0.05 percent by weight $SiO_2$ based on the weight of the raw titanium oxide pigment, the pigment having a tinting strength of 1670 and a mean diameter of less than 0.5 micron. The tint efficiency of the raw pigment cannot be determined because of floating or flooding.

One thousand (1,000) grams of the raw pigment is slurried in 3.75 liters of deionized water to form an aqueous slurry containing about 21 percent by weight pigment based on the total weight of the slurry.

The slurry is adjusted with 25 percent by weight $H_2SO_4$ from a pH of 3.7 to a pH of 1.2. There is then added 57 milliliters of aqueous $TiCl_4$ solution containing 247 grams of $TiCl_4$ per liter of solution.

The slurry is heated from 26° C. to 85° C. and the pH allowed to gradually increase from 1.2 to about 2.3 during a 45 to 60 minute period.

One hundred and five (105) grams of

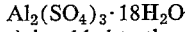
$Al_2(SO_4)_3 \cdot 18H_2O$ (in aqueous solution) is added to the slurry and the slurry pH adjusted to 4.5 with NaOH (25 percent by weight). The pH is then adjusted to 7.3 with 51 milliliters of aqueous $Na_2CO_3$ solution containing 25 percent by weight $Na_2CO_3$.

The slurry is digested for two hours at 85° C. and a pH of 7.3 to 8.0.

The slurry is filtered and there is recovered a pigment containing a hydrous coating of $TiO_2$ and $Al_2O_3$.

The recovered coated pigment has a tinting strength of 1750 and a tint efficiency of 92 percent.

Example II

One thousand (1,000) grams of the raw titanium oxide pigment prepared in Example I is slurried in 3.75 liters of deionized water.

The slurry is adjusted with concentrated $H_2SO_4$ from a pH of 4.1 to 1.5 and heated to 85° C. The pH is allowed to gradually increase upward. At a pH of 2.0, there is added to the slurry 5.0 grams of hydrofluoric acid (HF).

The slurry is adjusted with NaOH to a pH of 4.5. The pH is then decreased to 2.5 by the addition of 57 milliliters of aqueous $TiCl_4$ solution containing 247 grams of $TiCl_4$ per liter of solution.

One hundred and five (105) grams of $Al_2(SO_4)_3 \cdot 18H_2O$ is added and the slurry pH adjusted to 4.5 with NaOH.

The slurry is then adjusted to a pH of 7.3 with 80 milliliters of an aqueous solution containing 25 percent by weight $Na_2CO_3$, based on the total weight of the solution.

The slurry is digested for 50 minutes at 85° C. and at a pH of 7.0 to 7.3. The slurry is filtered and the coated titanium oxide pigment is recovered. The pigment has a tinting strength of 1780 and a tint efficiency of 99 percent.

Example III

Titanium tetrachloride ($TiCl_4$) is reacted in the vapor phase with oxygen in the presence of $AlCl_3$ and $SiCl_4$ to produce a raw titanium oxide pigment containing 1.80±.15 percent by weight $Al_2O_3$ and 0.56±0.05 percent by weight $SiO_2$, basis the weight of the titanium oxide pigment.

The raw titanium oxide pigment has a tinting strength of 1670. A tint efficiency cannot be determined for the raw pigment because of floating or flooding of the pigment.

One thousand (1,000) grams of the pigment is slurried in 3.75 liters of deionized water.

The slurry is adjusted with NaOH from a pH of about 4.4 to about 11.8 and digested at 85° C. for 93 minutes. The slurry is maintained at a pH of about 11.8 throughout the digestion by the addition of NaOH.

HCl is added to the slurry during a period of 104 minutes to lower the pH gradually to 6.5. The slurry is again digested at 85° C. for 59 minutes. At the end of the digestion, the slurry pH is 6.2.

The slurry is filtered and the resulting titanium oxide filter cake washed with 16 displacements of water. The cake is dried overnight at 65° C.

The dry, uncoated titanium oxide pigment has a tinting strength of 1770 and a tint efficiency of 102 percent.

Example IV

The procedure of Example III is repeated, except that the slurry is alkaline digested at the pH of 11.8 in the presence of 5 grams of hydrofluoric acid (added prior to digestion).

The recovered titanium oxide pigment has a tinting strength of 1800 and a tint efficiency of 105 percent.

Example V

Titanium tetrachloride ($TiCl_4$) is reacted in the vapor phase with oxygen in the presence of $AlCl_3$ and $AlCl_4$ to produce a raw titanium oxide pigment containing $1.80 \pm .15$ percent by weight $Al_2O_3$ and $0.56 \pm 0.05$ percent by weight $SiO_2$, basis the weight of the titanium oxide pigment.

The raw pigment has a tinting strength of 1670. A tint efficiency cannot be determined for the pigment because of floating.

One thousand (1,000) grams of the raw pigment is slurried with 3.75 liters of deionized water.

The slurry is adjusted with $H_2SO_4$ from a pH of 4.2 to about 0.5 and digested at 85° C. for 93 minutes. The slurry is maintained at the pH of about 0.5 throughout the digestion by the addition of $H_2SO_4$.

Gaseous $NH_3$ is added to the slurry during a period of 104 minutes to raise the pH gradually to 6.5. The slurry is again digested at 85° C. for 59 minutes. At the end of the digestion, the slurry pH is 6.2.

The slurry is filtered and the resulting titanium oxide filter cake is washed with 16 displacements of water. The cake is dried overnight at 65° C.

The dry, uncoated titanium oxide pigment has a tinting strength of 1770 and a tint efficiency of 102 percent.

Example VI

The procedure of Example V is repeated, except that 5.0 grams of hydrofluoric acid is added to the slurry immediately before the slurry is digested at a pH of 0.5.

The recovered, uncoated pigment has a tinting strength of 1800 and a tint efficiency of 105 percent.

Although this invention has been described with particular reference to the production of pigmentary $TiO_2$ from titanium halide, especially a titanium tetrahalide selected from the group consisting of $TiCl_4$, $TiBr_4$ and $TiI_4$, it may be employed in treating other raw metal oxides. The term "metal" as employed herein is defined as including those elements exhibiting metal-like properties including the metalloids.

Examples, not by way of limitation of metal oxides, which may be treated by the aforementioned process are the oxides of aluminum, arsenic, beryllium, boron, gadolinium, germanium, hafnium, lanthanum, iron, phosphorus, samarium, scandium, silicon, strontium, tantalum, tellurium, terbium, thorium, thulium, tin, titanium, ytterium, ytterbium, zinc, zirconium, niobium, gallium, antimony, lead, and mercury.

While this invention has been described by reference to specific details of certain embodiments, it will be understood that the invention is not intended to be construed as limited to such details, except insofar as they are included in the appended claims.

I claim:
1. A process for treating raw pigmentary silica containing titanium dioxide prepared by vapor phase oxidation of titanium tetrahalide selected from the group consisting of titanium tetrachloride, titanium tetrabromide and titanium tetraiodide in the presence of a member selected from the group consisting of silicon and silicon compounds, which comprises digesting an aqueous slurry of said pigment for at least five minutes at temperatures of from 50° C. to the boiling point of the slurry in the presence of at least 0.01 weight percent fluoride ion based on the amount of titanium dioxide.

2. A process according to claim 1 wherein the pH of the slurry during digestion is less than 3.0.

3. A process according to claim 1 wherein the fluoride ion is provided by a water-soluble inorganic fluorine-containing compound.

4. A process according to claim 1 wherein the titanium dioxide pigment contains at least 0.25 weight percent, based on titanium dioxide, of silica.

5. A process according to claim 1 wherein the fluoride ion is provided by hydrofluoric acid.

6. A process according to claim 1 wherein the amount of fluoride ion ranges from 0.05 to 5.0 weight percent based on the amount of titanium dioxide.

References Cited

UNITED STATES PATENTS

| 2,394,633 | 2/1946 | Pechukas et al. | 23—202 |
| 2,780,558 | 2/1957 | Wilcox | 106—300 |
| 3,022,186 | 2/1962 | Hund | 106—300 |
| 3,076,719 | 2/1963 | Whately et al. | 106—300 |
| 3,088,840 | 5/1963 | Arkless et al. | |
| 3,211,528 | 10/1965 | Wigginton | 23—202 |
| 3,251,705 | 5/1966 | Rieck et al. | 106—300 |
| 3,310,377 | 3/1967 | Stern et al. | |

FOREIGN PATENTS

| 448,345 | 6/1936 | Great Britain. |
| 758,409 | 10/1956 | Great Britain. |
| 953,936 | 2/1964 | Great Britain. |
| 969,352 | 9/1964 | Great Britain. |

EDWARD STERN, *Primary Examiner.*

U.S. Cl. X.R.

23—1, 21, 139, 140, 142, 144, 146, 148, 149, 165, 182, 183, 186, 200, 202, 345